United States Patent [19]

Alewelt et al.

[11] Patent Number: 5,444,148
[45] Date of Patent: Aug. 22, 1995

[54] IMPROVED TRANSESTERIFICATION PROCESS FOR THE PRODUCTION OF POLYCARBONATES

[75] Inventors: Wolfgang Alewelt; Steffen Kühling; Hermann Kauth, all of Krefeld, Germany

[73] Assignee: Bayer Aktiengesellschaft, Leverkusen, Germany

[21] Appl. No.: 155,391

[22] Filed: Nov. 19, 1993

[30] Foreign Application Priority Data

Dec. 3, 1992 [DE] Germany .............. 42 40 587.4

[51] Int. Cl.6 ................................. C08G 64/00
[52] U.S. Cl. ....................... 528/196; 526/67; 528/199
[58] Field of Search ............ 528/196, 199; 526/67

[56] References Cited

U.S. PATENT DOCUMENTS

| | | | |
|---|---|---|---|
| 2,964,797 | 12/1960 | Peilstöcker et al. | 18/57 |
| 3,014,891 | 12/1961 | Goldblum | 528/196 |
| 3,153,008 | 10/1964 | Fox . | |
| 3,282,893 | 11/1966 | Shechter | 528/196 |
| 4,267,303 | 5/1981 | König et al. | 528/171 |
| 4,284,757 | 8/1981 | Fayolle | 528/191 |
| 4,297,455 | 10/1981 | Linder et al. | 525/439 |
| 4,330,664 | 5/1982 | Brunelle | 528/198 |
| 5,104,963 | 4/1992 | Westeppe et al. | 528/196 |
| 5,191,001 | 3/1993 | Këhlig et al. | 524/125 |

FOREIGN PATENT DOCUMENTS 4038967 6/1991 Germany .

*Primary Examiner*—James J. Seidleck
*Assistant Examiner*—Terressa M. Mosley
*Attorney, Agent, or Firm*—Joseph C. Gil; Aron Preis

[57] ABSTRACT

An improvement to the transesterification process for the production of aromatic polycarbonates is disclosed. Into the melt which contains diphenols, carbonic acid diaryl esters and optionally branching agents and at temperatures of 130° C. to 400° C. and in the presence of catalysts there is mixed or passing thereover inert gas in a quantity of at least 0.5 Nm3 per kg of polycarbonate melt.

7 Claims, No Drawings

_5,444,148_

IMPROVED TRANSESTERIFICATION PROCESS FOR THE PRODUCTION OF POLYCARBONATES

FIELD OF THE INVENTION

The invention relates to a process for the preparation of polycarbonate resins and more particularly to the use of gas in the course of the process.

SUMMARY OF THE INVENTION

An improvement to the transesterification process for the production of aromatic polycarbonates is disclosed. Into the melt which contains diphenols, carbonic acid diaryl esters and, optionally, branching agents and at temperatures of 130° C. to 400° C. and in the presence of catalysts there is mixed or passing thereover inert gas in a quantity of at least 0.5 Nm3 per kg of polycarbonate melt.

DETAILED DESCRIPTION OF THE INVENTION

The present invention provides a process for the production of aromatic polycarbonates in a melt from diphenols, carbonic acid diaryl esters and, optionally, branching agents at temperatures from 130° C. to 400° C., preferably from 150° C. to 350° C. in the presence of catalysts and inert gases. According to the inventive process, an inert gas is used in quantities of at least 0.5 $Nm^3$ per kg of oligocarbonate/polycarbonate melt per hour, preferably of at least 1 $Nm^3$ per kg/h. The upper limit for inert gas usage is determined for the person skilled in the art by economic considerations.

The process may be performed discontinuously or continuously in one, two or more stages, wherein continuous operation is preferred. In continuous operation, the inert gas is fed or passed countercurrently from the higher to lower viscosity polycarbonate. The inert gases laden with monophenols and residual monomers may be purified by washing with a carbonic acid diaryl ester melt. Alternatively, the monophenols and residual monomers may be substantially removed from the inert gas laden with monophenols and residual monomers in a condenser.

The carbonic acid diaryl ester melt laden with monophenols and residual monomers may be reused as starting material for the production of polycarbonates.

The purified inert gas stream may also be reused or circulated as inert gas in the reaction system.

The melt transesterification process for the production of thermoplastic polycarbonates is known.

Thus, according to U.S. Pat. Nos. 2,964,797 and 3,153,008, melt transesterification is advantageously performed under reduced pressure using inert gas in order to avoid undesired oxidative secondary reactions, in particular, if extremely high temperatures and only a slight vacuum are used (U.S. Pat. No. 3,153,088, column 3, lines 53 to 63 and U.S. Pat. No. 2,964,797, column 4, lines 35 to 39). Melt transesterification may, however, also be performed at or above atmospheric pressure (U.S. Pat. No. 3,153,008, column 3, lines 63 to 65); since, in both patents, the inert gas acts only to provide an inert blanket, it is used, as described in the examples, only in small quantities.

In contrast, the process according to the invention is performed with at least 0.5 $Nm^3$ of inert gas per kg of oligo/polycarbonate melt per hour.

U.S. Pat. No. 3,014,891, column 3, lines 34 to 50, substantially confirms the explanations in U.S. Pat. No. 3,153,008 concerning the transesterification process. There is nothing in the reference relative to that transesterification may also be performed at or above atmospheric pressure. U.S. Pat. No. 3,282,893 also describes the production of polycarbonate according to the transesterification process, wherein reference is made to the necessity of reduced pressure (column 1, line 27 to 30 and column 3, lines 27 to 42 of the U.S. patent). It is furthermore taught in U.S. Pat. No. 3,282,893 that inert gases such as $N_2$ are not suitable for purifying polycarbonate melts of diaryl carbonate and phenol (column 1, lines 53 to 64 of U.S. Pat. No. 3,282,893). Steam combined with a vacuum is, therefore, used according to U.S. Pat. No. 3,282,893 to purify the polycarbonate melt, and namely in quantities of 0.1 to 20 wt. % related to the weight of the reactants.

In contrast, it has now been found that polycarbonate may be obtained in the present invention by injecting inert gas without simultaneously applying a vacuum.

Aromatic polycarbonates which may be produced pursuant to the process according to the invention are understood to include the known homopolycarbonates, copolycarbonates and blends of these polycarbonates, which may be derived, for example, from the following bisphenols: hydroquinone, resorcinol, dihydroxydiphenyls, bis-(hydroxyphenyl alkanes, bis-(hydroxyphenyl cycloalkanes, bis-(hydroxyphenyl) sulphides, bis-(hydroxyphenyl) ethers, bis-(hydroxyphenyl) ketones, bis-(hydroxyphenyl) sulphones, bis-(hydroxyphenyl) sulphoxides, α-α'-bis-(hydroxyphenyl)diisopropylbenzenes and their ring-alkylated and ring-halogenated derivatives.

Preferred diphenols are, for example: 2,2-bis-(4-hydroxyphenyl)propane, 2,4-bis-(4-hydroxyphenyl)-2-methylbutane, 1,1-bis-4-hydroxyphenyl-p-diisopropylbenzene, 2,2-bis-3-methyl-4-hydroxyphenyl)propane, 2,2-bis-(3-chloro-4-hydroxyphenyl) propane, bis-3.5-dimethyl-4-hydroxyphenyl)methane, 2,2-bis-(3,5-dimethyl-4-hydroxyphenyl)propane, bis-(3,5-dimethyl-4-hydroxyphenyl)sulphone, 2,4-bis-(3,5-dimethyl-4-hydroxyphenyl)-2-methylbutane, 1,1-bis-(3,5-dimethyl-4-hydroxyphenyl-p-diisopropylbenzene, 2,2-bis-(3,5-dichloro-4-hydroxyphenyl)propane, 2,2-bis-(3,5-dibromo-4-hydroxyphenyl)propane and 1,1-bis-(4-hydroxyphenyl)-3,3,5-trimethylcyclohexane.

Particularly preferred diphenols are: 4,4'-dihydroxydi-phenyl, phenyl, 4,4'-dihydroxydiphenyl sulphide, 2,2-bis-4-hydroxyphenyl propane, 2,2-bis-3,5-dimethyl-4-hydroxyphenyl)propane, 2,2-bis-3,5-dichloro-4-hydroxyphenyl)propane, 2,2-bis-3,5-dibromo-4-hydroxyphenyl)propane, 1,1-bis-(4-hydroxyphenyl)cyclohexane and 1,1-bis-(4-hydroxyphenyl)-3,3,5-trimethylcyclohexane.

The polycarbonates may be deliberately and purposefully branched by using small quantities of branching agents. Some suitable branching agents are: phloroglucinol, 4,6-dimethyl-2,4,6-tri-(4-hydroxyphenyl)heptene-2, 4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-4-hydroxyphenyl phenylmethane, 2,2-bis-[4,4-bis-(4-hydroxyphenyl)cyclohexyl]propane, 2,4-bis-(4-hydroxyphenyl-isopropyl)phenol, 2,6-bis-(2-hydroxy-5'-methylbenzyl-4-methylphenol, 2-(4-hydroxyphenyl)-2-(2,4-dihydroxyphenyl propane, hexa-4-(4-hydroxyphenyl-isopropyl)phenyl orthoterephthalic acid ester, tetra-(4-hydroxyphenyl)methane, tetra-(4-(4-hydroxyphenyl-isopropyl)phenoxy)methane, 1,4-bis-(4,4''-dihydroxytriphenyl)methyl)-benzene and in particular α,α', α''-tris-(4-hydroxyphenyl)-1,3,5-triisopropylbenzene. Further possible branching agents are 2,4-hydroxybenzoic acid, trimesic acid and 3,3-bis-(3-methyl-4-hydroxyphenyl-2-oxo-2,3-dihydroindole.

The optional 0.05 to 2 mol % of branching agents, related to the quantity of diphenols used, may be used together with the diphenols.

As indicated in the examples, diphenyl carbonate is particularly preferred as the carbonic acid diester. Related to 1 mol of bisphenol, the carbonic acid diesters are used in a quantity of 1.01 to 1.30 mol, preferably 1.02 to 1.15 mol.

The catalysts to be used are known alkali metal, alkali earth metal and transitional metal hydroxides, alkoxides, phenolates, carbonates, acetates, borates, hydrogen phosphates, hydrides and ammonium or phosphonium salts, such as, for example, tetramethylammonium hydroxide, tetramethylammonium tetraphenylborate and tetraphenylphosphonium tetraphenylborate.

The following are, for example, suitable as equipment, stirred-tank reactors, film evaporators, series of stirred-tank reactors, extruders, kneaders, simple disk: reactors or high viscosity disk reactors.

Suitable inert gases are, for example, the noble gases, nitrogen or $CO_2$, nitrogen is preferred. The inert gas is passed into/over or mixed with the diphenol/carbonic acid diaryl ester/oligocarbonate/polycarbonate melt and then passes through the above-mentioned equipment, countercurrently in continuously operating plants. The quantity of inert gas is at least 0.5 Nm3 per kg of oligocarbonate/polycarbonate melt or, in the case of continuous operation, at least 0.5 $Nm^3$/hour for 1 kg of diphenol/carbonic acid diaryl ester/oligocarbonate/-polycarbonate melt. The inert gas is preferably preheated to temperatures of 130° C. to 400° C.

The polycarbonates obtainable in accordance with the process according to the invention may be pelletized in a known manner.

The polycarbonates obtainable in accordance with the invention preferably have weight average molecular weights (determined by measuring relative viscosity in $CH_2Cl_2$ at 25° C. and a concentration of 0.5 g in 100 ml of $CH_2Cl_2$) of 3000 to 200000, preferably from 5000 to 60000; they, therefore, include both the range of products customarily known as oligocarbonates and very high molecular weight products. Adjustment of the particular molecular weight is achieved by adjusting temperature, the quantity of nitrogen and the dwell time. By transesterifying with higher-boiling phenols, for example, cumylphenol, t-butylphenol, isooctylphenol according to EP 360,578, end groups other than those pre-determined by the carbonic acid diaryl ester may be introduced.

The oligocarbonates obtainable in accordance with the process according to the invention may, for example, be used as intermediates in organic syntheses or as additives.

The thermoplastic polycarbonates obtainable in accordance with the process according to the invention may be combined with auxiliaries and reinforcing materials for industrial use. Such substances which may, inter alia, be considered are: stabilizers, flow auxiliaries, mold release agents, flame retardants, pigments, finely divided minerals, fibrous materials, for example, alkyl and aryl phosphites, phosphates, phosphanes, low molecular weight carboxylic acid esters, halogen compounds, salts, chalk, silica flour, glass fibers and carbon fibres. Furthermore, the thermoplastic polycarbonates obtainable in accordance with the process according to the invention may also be blended with other polymers, for example, polyolefines, polyurethanes, polystyrene. These substances are preferably added to the finished polycarbonate in customary units, but, depending on requirements, they may, however, be added in a further stage of the process according to the invention.

The polycarbonates obtainable in accordance with the process according to the invention may be processed into any desired moldings in customary machinery, for example, in extruders or injection molding machines, for example, into film or sheet. The industrial use of these polycarbonate moldings may, for example, be in optical applications, electrical engineering and in the construction sector.

The invention is further illustrated but is not intended to be limited by the following examples in which all parts and percentages are by weight unless otherwise specified.

EXAMPLES

Example 1

114.15 g (0.500 mol) of bisphenol A and 113.54 g (0.530 mol) of diphenyl carbonate are weighed out into a 500 ml three-necked flask with stirrer, internal thermometer and heatable (10 cm) column with a bridge. Atmospheric oxygen is driven out of the apparatus using a gentle stream of nitrogen and the mixture is heated to 150° C. 0.00029 g ($5 \times 10^{-4}$ mol %) of sodium phenolate, related to bisphenol A, are then added as a 1% aqueous solution and the phenol produced is driven out or distilled off by introducing 100 liter (1) of $N_2$ per hour into the melt (the nitrogen is heated to the particular reaction temperature by being passed through a heated metal tube). The inert gas stream is then passed through a diphenyl carbonate melt, thus removing residual quantities of phenol and residual monomer (bisphenol A). The temperature is simultaneously increased to 250° C. After a further hour, the temperature is raised to 280° C. After a further two hours, a polycarbonate is obtained containing no solvent and with a relative solution viscosity of 1.243 (dichloromethane, 25° C., 5 g/l).

Example 2

As Example 1, but 0.0039 g of $N(CH_3)_4$ $BPh_4$ ($2 \times 10^{-3}$ mol %) catalyst are used. A polycarbonate containing no solvent is obtained with a relative solution viscosity of 1.283 (dichloromethane, 25° C., 5 gl).

Example 3

As Example 2, but 200 l of $N_2$/hour are passed through the melt. A polycarbonate containing no solvent is obtained with a relative solution viscosity of 1.333 (dichloromethane, 25° C., 5 g/l).

Example 4

7695 g (33.75 mol) of bisphenol A, 7584 g (35.45 mol) of diphenyl carbonate and 888 mg of $PPh_4BPh_4$ ($4 \times 10^{-3}$ mol %) are weighed out into a 25 l stirred vessel with distillation device (column). The vessel is provided with an inert blanket of nitrogen and the raw materials are heated to 180° C. in 15 minutes. At a material temperature of 100° C., the stirrer is switched on and 12 $m^3$/h of nitrogen (originating from the high viscosity stage of the ZSK 32) are fed in through a valve in the bottom. The expelled phenol is driven out or distilled off. The inert gas stream is then passed through a diphenyl carbonate melt and thus removing the residual quantities of phenol and residual monomer (bisphenol A). The temperature is raised from 180° C. to 250° C. within one hour. The temperature is maintained at 280° C. for a further hour. The oligocarbonate formed has a relative solution viscosity of 1.168 (dichloromethane, 25° C., 5 g/l).

Oligocarbonate synthesis is performed alternately in two stirred-tank reactors which are available in parallel. The nitrogen from the ZSK is also alternately passed through the bottom valve of the stirred-tank reactor.

This oligocarbonate is then condensed in a ZSK 32 with a screw speed of 100 rpm (material temperature 300° C.), 8 m³/h of $N_2$ being introduced countercurrently (heated to 300° C.) and at a throughput of 3 kg/h. The nitrogen stream which has passed through is then used as an inert gas stream in the production of the oligocarbonates. A polycarbonate is obtained with a relative solution viscosity of 1.222 (dichloromethane, 25° C., 5 g/l).

Example 5

As Example 4, but using a throughput of 2.5 kg/h. A polycarbonate is obtained with a relative solution viscosity of 1.228 (dichloromethane, 25° C., 5 g/l).

Example 6

As Example 5, but using a throughput of 2.0 kg/h. A polycarbonate is obtained with a relative solution viscosity of 1.240 (dichloromethane, 25° C., 5 g/l).

Example 7

As Example 4, but using a throughput of 1.5 kg/h. A polycarbonate is obtained with a relative solution viscosity of 1.278 (dichloromethane, 25° C. 5 g/l).

Example 8

As Example 4, but using a throughput of 1.5 kg/h at a screw temperature of 320° C. A polycarbonate is obtained with a relative solution viscosity of 1.290 (dichloromethane, 25° C. 5 g/l).

Example 9

As Example 8, but using a throughput of 2.0 kg/h. A polycarbonate is obtained with a relative solution viscosity of 1.261 (dichloromethane, 25° C. 5 g/l).

Example 10

As Example 8, but using a throughput of 2.5 kg/h. A polycarbonate is obtained with a relative solution viscosity of 1.244 (dichloromethane, 25° C. 5 g/l).

Example 11

The diphenyl carbonate used to wash the inert gas stream is used as described in Example 1 instead of the fresh diphenyl carbonate. A polycarbonate is obtained with a relative solution viscosity of 1.239 (dichloromethane, 25° C., 5 g/l).

Example 12

A metering pump is used to introduce an hourly quantity of a diphenyl carbonate/bisphenol A/catalyst melt at 150° C. of 1141.5 g of bisphenol A (5.0 mol), 1135.4 g of diphenyl carbonate (5.3 mol), 0.0029 g of sodium phenolate ($5 \times 10^{-4}$ mol %) into the first tank of a series of stirred-tank reactors consisting of three tanks with stirrer, overflow, distillation device (columns for tanks 1 and 2) and nitrogen feed into the melt through the bottom valve. The first tank is heated to 200° C. and has a capacity to the overflow of 1.3 l (corresponding to an average dwell time of approx. 1 hour). The second tank is heated to 250° C. and has a volume to the overflow of 2.5 l (corresponding to an average dwell time of approx. 2 hours). This overflow leads to the third tank, which is heated to 300° C. and from which the melt is spun. The tank volume is 2.5 l (corresponding to an average dwell time of approx. 2 hours). The nitrogen stream (1.5 m³/h, heated to 300° C.) is passed countercurrently from tank 3 (high viscosity stage) to tank 1 and then through a diphenyl carbonate melt, thus removing the residual quantity of phenol and residual monomer (bisphenol A). A polycarbonate is obtained with a relative solution viscosity of 1,279 (dichloromethane, 25° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In the transesterification process for the production of aromatic polycarbonates having a weight average molecular weight of 3000 to 200000 in a melt from diphenols, carbonic acid diaryl esters and optionally branching agents at temperatures of 130° C. to 400° C. and in the presence of catalysts, the improvement comprising mixing in said melt or passing thereover, without the simultaneous application of a vacuum, inert gas selected from the group consisting of noble gases, nitrogen and $CO_2$, in a quantity of at least 0.5 Nm³ per Kg of oligocarbonate/polycarbonate melt per hour.

2. The process of claim 1 wherein said quantity is at least 1 Nm³ per kg of oligocarbonate/polycarbonate melt per hour.

3. The process of claim 1 characterized in that said process is performed continuously in at least two stages and that the inert gas is introduced as a stream which is passed countercurrently from the higher viscosity to the lower viscosity polycarbonate.

4. Process according to claim 1, characterised in that the inert gas stream is purified of the monophenols and residual monomers by washing with a carbonic acid diaryl ester melt.

5. Process according to claim 1, characterised in that the carbonic acid diaryl ester melt laden with monophenols and residual monomers is reused in the synthesis.

6. The process of claim 2 wherein said inert gas stream is purified of monophenols and residual monomers by washing with a carbonic acid diaryl ester melt.

7. The process of claim 2 wherein said carbonic acid diaryl ester melt laden with monophenols and residual monomers is reused.

* * * * *